United States Patent
Sugiyama et al.

(10) Patent No.: US 10,876,616 B2
(45) Date of Patent: Dec. 29, 2020

(54) POWER TRANSMISSION DEVICE FOR VEHICLE

(71) Applicants: Toyota Jidosha Kabushiki Kaisha, Toyota (JP); Aisin AW Co., Ltd., Anjo (JP)

(72) Inventors: Masataka Sugiyama, Toyota (JP); Kenji Tanabe, Toyota (JP); Takeshi Kuwahara, Toyota (JP); Tomohisa Taga, Toyota (JP); Akihiko Ikeda, Miyoshi (JP); Fumiaki Shigematsu, Anjo (JP); Atomi Arakawa, Anjo (JP); Masamitsu Seno, Anjo (JP)

(73) Assignees: Toyota Jidosha Kabushiki Kaisha, Toyota (JP); Aisin AW Co., Ltd., Anjo (JP)

(*) Notice: Subject to any disclaimer, the term of this patent is extended or adjusted under 35 U.S.C. 154(b) by 135 days.

(21) Appl. No.: 16/282,610

(22) Filed: Feb. 22, 2019

(65) Prior Publication Data
US 2019/0264797 A1    Aug. 29, 2019

(30) Foreign Application Priority Data

Feb. 23, 2018 (JP) .................................. 2018-031139

(51) Int. Cl.
*F16H 57/031* (2012.01)
*B60K 6/445* (2007.10)
(Continued)

(52) U.S. Cl.
CPC .......... *F16H 57/031* (2013.01); *B60K 6/365* (2013.01); *B60K 6/405* (2013.01); *B60K 6/445* (2013.01)

(58) Field of Classification Search
CPC .......... B60K 5/40; B60K 5/405; F16H 57/031
See application file for complete search history.

(56) References Cited

U.S. PATENT DOCUMENTS

| | | | | |
|---|---|---|---|---|
| 4,924,978 A | * | 5/1990 | Ohkubo | .................. F16H 45/02 |
| | | | | 192/106 F |
| 5,599,247 A | * | 2/1997 | Matsufuji | .............. B60K 17/28 |
| | | | | 475/128 |

(Continued)

FOREIGN PATENT DOCUMENTS

| | | |
|---|---|---|
| JP | 2011-256919 | 12/2011 |
| JP | 2012-52478 | 3/2012 |
| JP | 2014-88906 | 5/2014 |

*Primary Examiner* — John D Walters
*Assistant Examiner* — James J Triggs
(74) *Attorney, Agent, or Firm* — Oblon, McClelland, Maier & Neustadt, L.L.P.

(57) ABSTRACT

In a power transmission device for a vehicle, comprising: a transaxle casing in which a motor and a voltage power line are housed; and a cover attached so as to close an opening of the transaxle casing, the cover includes a flange portion provided at an outer edge portion of the cover and connected to the opening of the transaxle casing, a bearing support portion for a bearing that supports a rotary shaft rotatably, and a cover wall provided between the flange portion and the bearing support portion, and a valve body is attached to the cover wall so as to be positioned at a portion of the cover wall at which a direct distance between the bearing support portion and the flange portion surrounding the bearing support portion is longest.

8 Claims, 3 Drawing Sheets

(51) Int. Cl.
*B60K 6/365* (2007.10)
*B60K 6/405* (2007.10)

(56) References Cited

U.S. PATENT DOCUMENTS

| | | | | |
|---|---|---|---|---|
| 6,394,130 | B1* | 5/2002 | Deininger | B66F 9/22 |
| | | | | 137/596.12 |
| 6,948,606 | B2* | 9/2005 | Ida | F16H 57/0436 |
| | | | | 184/6.27 |
| 2007/0251344 | A1* | 11/2007 | Malpier | F16H 3/62 |
| | | | | 74/325 |
| 2007/0265129 | A1* | 11/2007 | Kasuya | B60K 6/445 |
| | | | | 475/32 |
| 2016/0230850 | A1* | 8/2016 | Kanada | F16H 61/0265 |
| 2019/0040948 | A1* | 2/2019 | Uesugi | B22F 3/16 |
| 2019/0101205 | A1* | 4/2019 | Ishikawa | F16H 57/028 |
| 2019/0390759 | A1* | 12/2019 | Nikprelevic | F16J 15/062 |

\* cited by examiner

POWER TRANSMISSION DEVICE FOR VEHICLE

This application claims priority from Japanese Patent Application No. 2018-031139 filed on Feb. 23, 2018, the disclosure of which is herein incorporated by reference in its entirety.

FIELD OF THE ART

The present invention relates to a power transmission device for a vehicle, and particularly, to a power transmission device that houses a motor inside.

BACKGROUND ART

A power transmission device for a vehicle in which a motor and a voltage power line are housed inside a transaxle casing has been known. For example, there is a power transmission device for a vehicle described in Patent Document 1. Patent Document 1 describes that to suppress noise from being generated by vibration of a cover closing an opening of a transaxle casing, the cover is formed to have an arcuate cross-section.

PRIOR ART DOCUMENT

Patent Document

[PATENT DOCUMENT 1] Japan Patent Publication No. 2011-256919
[PATENT DOCUMENT 2] Japan Patent Publication No. 2012-52478
[PATENT DOCUMENT 3] Japan Patent Publication No. 2014-88906

SUMMARY OF THE INVENTION

Technical Problem

As in the power transmission device described in Patent Document 1, in a structure in which a motor and a voltage power line are housed inside a transaxle casing, a region in which the motor and the voltage power line are disposed is provided with a predetermined insulation gap, so that a distance between a flange portion formed at an outer edge portion of the cover and a bearing support portion to which a bearing is fitted tends to become long. As a result, rigidity of a cover wall provided between the flange portion of the cover and the support portion of the bearing is lowered, so that there is a risk that durability of the cover surface is deteriorated.

The present invention was made in view of the above-described circumstances, and an object thereof is to provide a structure suppressing deterioration of durability of a cover in a power transmission device for a vehicle in which a motor and a voltage power line are housed inside a transaxle casing.

Solution to Problem

To achieve the above object, a first aspect of the present invention provides a power transmission device for a vehicle, comprising: (a) a transaxle casing in which a motor and a voltage power line are housed; and a cover attached so as to close an opening of the transaxle casing, wherein (b) the cover includes a flange portion provided at an outer edge portion of the cover and connected to the opening of the transaxle casing, a bearing support portion for a bearing that supports a rotary shaft rotatably, and a cover wall provided between the flange portion and the bearing support portion, and (c) a valve body is attached to the cover wall so as to be positioned at a portion of the cover wall at which a direct distance between the bearing support portion and the flange portion surrounding the bearing support portion is longest.

A second aspect of the present invention provides the power transmission device for a vehicle recited in the first aspect of the invention, wherein the valve body is attached to the cover wall so as to overlap the voltage power line when viewed in an axial direction of the rotary shaft.

A third aspect of the present invention provides the power transmission device for a vehicle recited in the first or second aspect of the invention, wherein (a) the bearing support portion is a cylindrical member formed cylindrically, and (b) the bearing is fitted to an inner circumferential surface of the cylindrical member.

A fourth aspect of the present invention provides the power transmission device for a vehicle recited in any one of the first to third aspects of the invention, wherein the rotary shaft is a rotor shaft of the motor.

Advantageous Effects of Invention

According to the first aspect of the invention of a power transmission device for a vehicle of the present invention, the valve body is attached to the cover wall so as to be positioned at a portion of the cover wall at which a direct distance between the bearing support portion and the flange portion surrounding the bearing support portion is longest, and therefore, a portion with relatively low rigidity in the cover wall is reinforced by the valve body, and rigidity deterioration of the cover wall is suppressed. In addition, the valve body provided in the power transmission device functions as reinforcing members for the cover wall, so that there is no need to provide a new member to reinforce the cover wall, and increases in weight and in number of components of the vehicle are also suppressed.

According to the second aspect of the invention of a power transmission device for a vehicle of the present invention, the valve body is attached to the cover wall so as to overlap the voltage power line in the axial direction of the rotary shaft, so that the voltage power line is protected by the valve body, and even in a case of a collision of the vehicle, damage to the voltage power line by fragments of the cover wall is suppressed.

According to the third aspect of a power transmission device for a vehicle of the present invention, due to a bearing fitted to the inner circumferential surface of the cylindrical member, the rotary shaft can be rotatably supported by the bearing support portion via the bearing.

According to the fourth aspect of a power transmission device for a vehicle of the present invention, a rotor shaft of the motor can be rotatably supported by the bearing support portion.

DESCRIPTION OF THE EMBODIMENT

Hereinafter, an example of the present invention is described in detail with reference to the drawings. In the following example, the drawings are simplified or modified as appropriate, and dimensional ratios and shapes of the respective portions are not always accurate.

EXAMPLE

Figure 1:
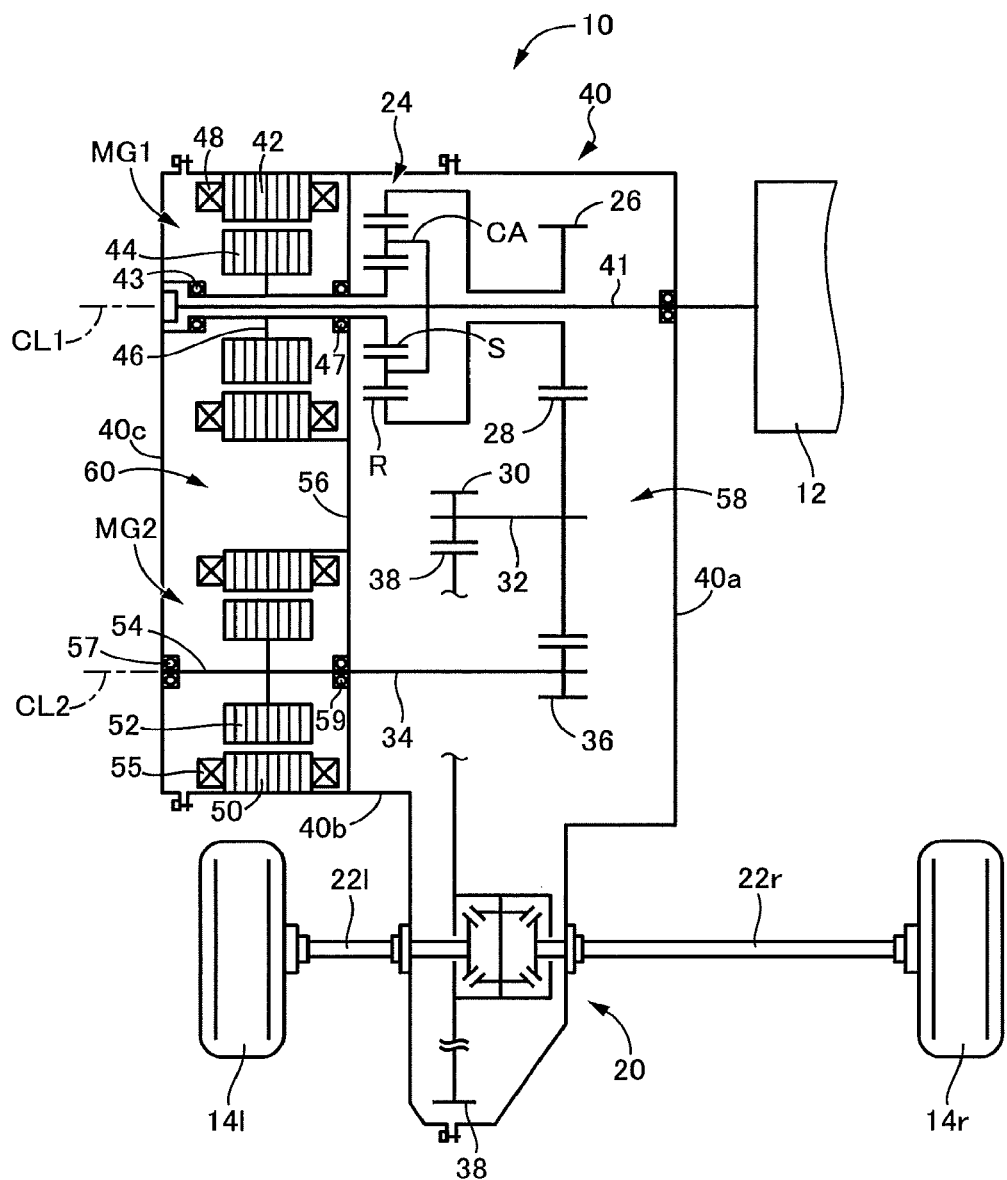
FIG. 1 is a skeleton view illustrating a configuration of a power transmission device for a vehicle to which the present invention is applied.

FIG. 1 is a skeleton view illustrating a configuration of a power transmission device 10 for a vehicle (hereinafter, referred to as a power transmission device 10) to which the present invention is applied. The power transmission device 10 is preferably used in an FF (front-engine/front-drive) type vehicle, and is provided between an engine 12 as a main drive power source and drive wheels 14*l* and 14*r*. The power transmission device 10 is a hybrid type power transmission device that transmits power output from the engine 12 and a second electric motor MG2 to the pair of left and right drive wheels 14*l* and 14*r* via a differential gear device 20 and a pair of left and right axles 22*l* and 22*r*.

The power transmission device 10 includes a planetary gear device 24 including a sun gear S, a carrier CA, and a ring gear R as three rotating elements; a first electric motor MG1 connected to the sun gear S of the planetary gear device 24; an output gear 26 connected to the ring gear R of the planetary gear device 24; a counter shaft 32 provided with a counter gear 28 that meshes with the output gear 26 and a differential drive gear 30; a second electric motor MG2 that transmits power to the counter gear 28 via a power transmission shaft 34 and a reduction gear 36; a differential gear device 20 including a differential ring gear 38 that meshes with the differential drive gear 30; and a pair of left and right axles 22*l* and 22*r* connected to the differential gear device 20 and the drive wheels 14. The first electric motor MG1 corresponds to the motor of the present invention.

The planetary gear device 24 comprises a single pinion type planetary gear device. The planetary gear device 24 functions as a power distribution mechanism that distributes power of the engine 12 to the output gear 26 and the first electric motor MG1. The sun gear S of the planetary gear device 24 is connected to the first electric motor MG1 in a power-transmittable manner, the carrier CA is joined to the engine 12 via an input shaft 41 in a power-transmittable manner, and the ring gear R is joined to the output gear 26 in a power-transmittable manner.

The counter gear 28 meshes with the output gear 26 and the reduction gear 36. A reduction gear 38 is connected to the second electric motor MG2 via a power transmission shaft 34 in a power-transmittable manner. The differential drive gear 30 with a smaller diameter than the counter gear 28 is provided on the counter shaft 32, and the differential drive gear 30 meshes with the differential ring gear 38 of the differential gear device 20.

The first electric motor MG1 includes a stator 42 of cylindrical shape fixed in a non-rotatable manner to a casing 40 as a non-rotating member, a rotor 44 of cylindrical shape disposed on an inner circumferential side of the stator 42, and a rotor shaft 46 connected to an inner circumference of the rotor 44. On the stator 42, a stator coil 48 is wound. The rotor shaft 46 is supported rotatably around a rotation axis CL1 by a bearing 43 and a bearing 47. The stator coil 48 corresponds to the voltage power line of the present invention.

The second electric motor MG2 includes a stator 50 of cylindrical shape fixed in a non-rotatable manner to the casing 40 as a non-rotating member, a rotor 52 of cylindrical shape disposed on an inner circumferential side of the stator 50, and a rotor shaft 54 connected to an inner circumference of the rotor 52. On the stator 50, a stator coil 55 is wound. The rotor shaft 54 is supported rotatably around a rotation axis CL2 by a bearing 57 and a bearing 59.

In the power transmission device 10 configured as described above, power of the engine 12 is transmitted to the drive wheels 14*l* and 14*r* through the planetary gear device 24, the output gear 26, the counter gear 28, the counter shaft 32, the differential drive gear 30, the differential gear device 20, and the axles 22*l* and 22*r*. Power of the second electric motor MG2 is transmitted to the drive wheels 14*l* and 14*r* through the power transmission shaft 34, the reduction gear 36, the counter gear 28, the counter shaft 32, the differential drive gear 30, the differential gear device 20, and the axles 22*l* and 22*r*.

The casing 40 includes a housing 40*a*, an axle casing 40*b*, and a casing cover 40*c*. The axle casing 40*b* opens at both sides in an axial direction of the input shaft 41, and one opening of the axle casing 40*b* is connected to the housing 40*a*, and the other opening of the axle casing 40*b* is connected to the casing cover 40*c*. The axle casing 40*b* corresponds to the transaxle casing of the present invention, and the casing cover 40*c* corresponds to the cover of the present invention.

In the axle casing 40*b*, a partition wall 56 perpendicular to the rotation axis CL1 is formed. Due to the partition wall 56, the inside of the casing 40 is partitioned into a gear chamber 58 in which the planetary gear device 24, the output gear 26, the counter gear 28, the reduction gear 36, and the differential gear device 20, etc., are housed, and a motor chamber 60 in which the first electric motor MG1 and the second electric motor MG2 are housed.

The casing cover 40*c* is formed into a tray shape, and attached so as to close an opening of a wall 61 forming the motor chamber 60 of the axle casing 40*b*. In detail, a mating surface 70 (refer to FIG. 2) of a flange portion 62 formed at an outer edge portion of the casing cover 40*c* and a mating surface 76 (refer to FIG. 4) formed at an opening of the wall 61 are fastened to each other by bolts while being closely fitted to each other.

Figure 2:
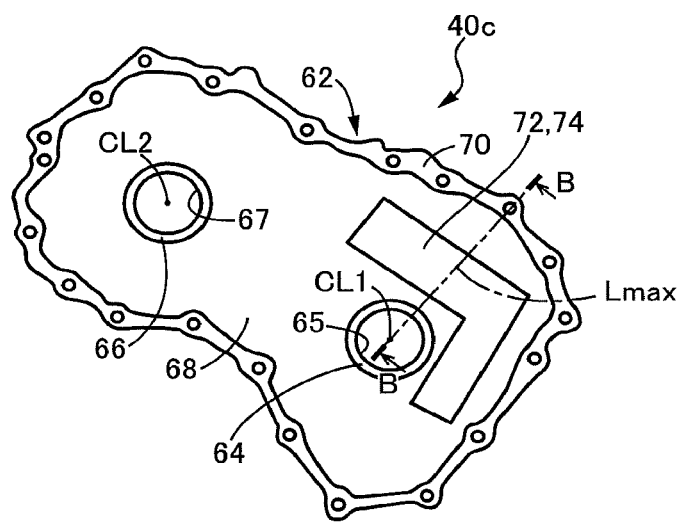
FIG. 2 is a view of a casing cover in FIG. 1 viewed in an axial direction of an input shaft from an engine side.
Figure 3:
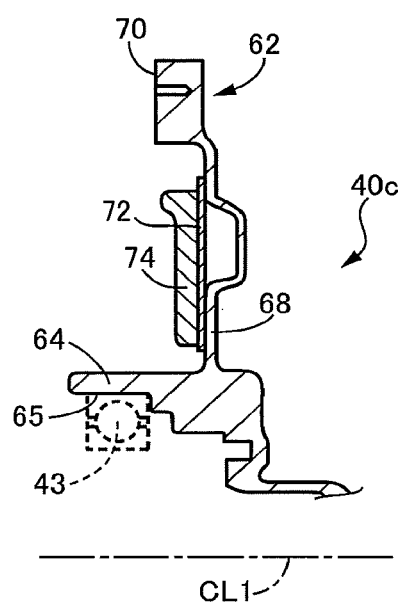
FIG. 3 is a sectional view of the casing cover taken along B-B in FIG. 2.

FIG. 2 is a view of the casing cover 40*c* in FIG. 1 viewed in an axial direction of the input shaft 41 (hereinafter, the axial direction of the input shaft 41 is simply referred to as an axial direction) from the engine 12 side. FIG. 3 is a sectional view of the casing cover 40*c* taken along B-B in FIG. 2. As shown in FIG. 2, the casing cover 40*c* is formed of the flange portion 62 that is provided at an outer edge portion of the casing cover 40*c* and connected to the mating surface 76 formed at the opening of the axle casing 40*b*, a first bearing support portion 64 to support the bearing 43 which rotatably supports the rotor shaft 46 of the first electric motor MG1, a second bearing support portion 66 to support the bearing 57 which rotatably supports the rotor shaft 54 of the second electric motor MG2, and a cover wall 68 forming a wall between the flange portion 62 and each of the first bearing support portion 64 and the second bearing support portion 66. The first bearing support portion 64 corresponds to the bearing support portion of the present invention.

On the flange portion 62 of the casing cover 40c, the mating surface 70 to be closely fitted to the mating surface 76 (refer to FIG. 4) of the axle casing 40b in an assembled state is formed. The first bearing support portion 64 is a cylindrical member formed cylindrically, and an outer race of the bearing 43 is fitted to an inner circumferential surface 65 of the first bearing support portion 64. The second bearing support portion 66 is a cylindrical member formed cylindrically, and an outer race of the bearing 57 is fitted to an inner circumferential surface 67 of the second bearing support portion 66.

As shown in the B-B sectional view of FIG. 3, the first bearing support portion 64 being a cylindrical member is centered at the rotation axis CL1 and extends parallel to the rotation axis CL1. The flange portion 62 is formed at a radially outward side, that is, an outer edge portion side of the first bearing support portion 64 centered at the rotation axis CL1. The cover wall 68 is provided between the first bearing support portion 64 and the flange portion 62.

The first electric motor MG1 and the second electric motor MG2 are housed in the motor chamber 60 of the axle casing 40b, so that in the casing cover 40c, distances between the flange portion 62 surrounding these first bearing support portion 64 and the second bearing support portion 66 and respective one of the first bearing support portion 64 and the second bearing support portion 66 increase. That is, the area of the cover wall 68 becomes larger, and the length of the cover wall 68 provided between the flange portion 62 and respective one of the first bearing support portion and the second bearing support portion 66 becomes longer. Therefore, rigidity of the cover wall 68 linking the flange portion 62 and respective one of the first bearing support portion 64 and the second bearing support portion 66 is lowered, and there is a risk that durability of the cover wall 68 is deteriorated. It is possible that the rigidity of the cover wall 68 is improved by increasing the thickness of the cover wall 68 or forming the cover wall 68 so as to have a curved shape, however, this makes problems such as an increase in weight of the casing cover 40c and deterioration of productivity and mountability.

In addition, in relation to deterioration of rigidity of the cover wall 68, the cover wall 68 is easily broken at the time of a collision of the vehicle, and therefore, fragments of the cover wall 68 damage the stator coils 48 and 55 and easily cause short-circuiting. It is considered that a protective member may be attached to a portion that is easily broken in case of a collision in the casing cover 40c to improve rigidity of the casing cover 40c and protect the stator coils 48 and 55, however, provision of the protective member increases the vehicle weight, and increases the number of components.

Therefore, in the present example, a valve body plate 72 formed of a steel plate and a valve body 74 are attached to the cover wall 68 of the casing cover 40c. The valve body 74 is attached to the cover wall 68 of the casing cover 40c such that the valve body plate 72 is put between the valve body 74 and the cover wall 68. The valve body plate 72 and the valve body 74 are fastened to the cover wall 68 by bolts not illustrated. By attaching these valve body plate 72 and valve body 74 to the cover wall 68, rigidity of the cover wall 68 is improved, and durability of the cover wall 68 is also improved. The valve body 74 is a well-known component (configuration) of a hydraulic circuit in which a switching valve(s) for switching oil paths and a solenoid valve(s) for adjusting a hydraulic pressure are housed, and has high rigidity as compared with the cover wall 68.

Next, a position on the cover wall 68 to which the valve body plate 72 and the valve body 74 are attached is described. In the cover wall 68, at a portion at which the distance of the cover wall 68 linking the flange portion 62 surrounding the first bearing support portion 64 and the first bearing support portion 64 is longer, the rigidity of the cover wall 68 becomes relatively low. Therefore, in the present example, the valve body plate 72 and the valve body 74 are attached to the cover wall 68 so as to be positioned at a portion of a straight line Lmax a direct distance of which between the center (CL1) of the first bearing support portion 64 and the flange portion 62 surrounding the first bearing support portion 64 is longest on the cover wall 68, that is, so as to overlap the straight line Lmax when the casing cover 40c is viewed in the axial direction.

In the present example, to distinguish the flange portion 62 surrounding the first bearing support portion 64 and the flange portion 62 surrounding the second bearing support portion 66, a portion in the flange portion 62 at which a direct distance to the center of the first bearing support portion 64 is shorter than a direct distance to the center of the second bearing support portion 66 is defined as "the flange portion 62 surrounding the first bearing support portion 64". On the other hand, in the flange portion 62, a portion at which a direct distance to the center of the second bearing support portion 66 is shorter than a direct distance to the center of the first bearing support portion 64 is defined as "the flange portion 62 surrounding the second bearing support portion 66".

A portion of the cover wall 68 that overlaps the straight line Lmax when the casing cover 40c is viewed in the axial direction, has the longest distance between the flange portion 62 and the first bearing support portion 64, so that rigidity relatively deteriorates as compared with other portions of the cover wall 68. On the other hand, by attaching the valve body plate 72 and the valve body 74 to the cover wall 68 so as to overlap the straight line Lmax when viewed in the axial direction, rigidity of the portion of the cover wall 68 at which rigidity is relatively low is improved, and durability of the cover wall 68 is also improved.

Figure 4:
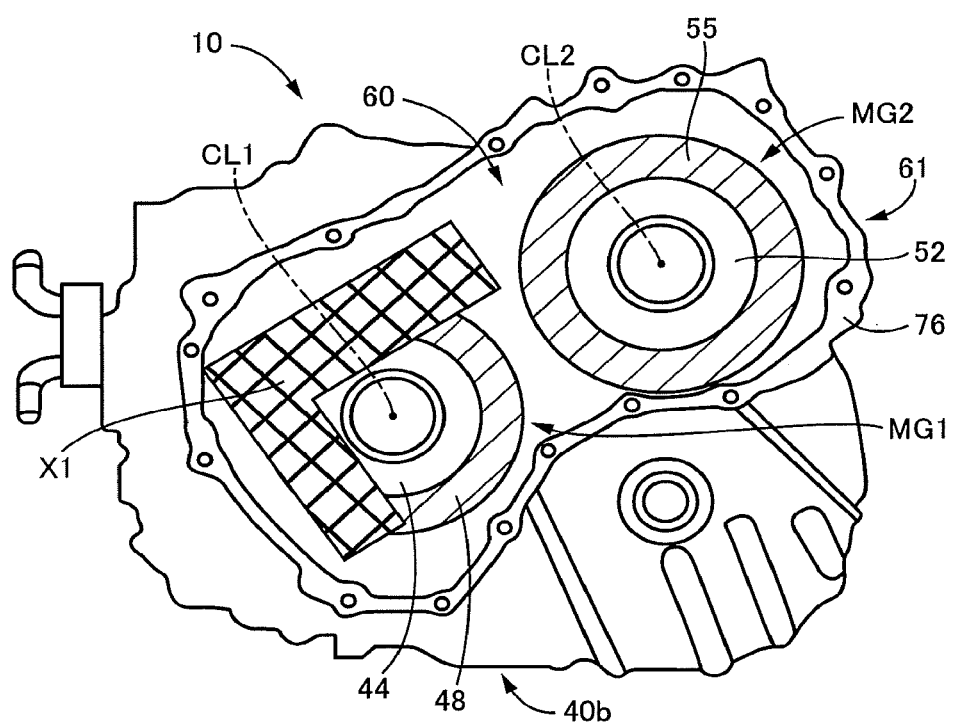
FIG. 4 is a view of the power transmission device shown in FIG. 1, viewed in the axial direction from the casing cover side, and shows a state where the casing cover is removed.

FIG. 4 is a view of the power transmission device 10 shown in FIG. 1, viewed in the axial direction from the casing cover 40c side, and shows a state where the casing cover 40c is removed. As shown in FIG. 4, inside the wall 61 forming the motor chamber 60 of the axle casing 40b, the first electric motor MG1 and the second electric motor MG2 are housed.

In FIG. 4, a portion the inside of which is crosshatched corresponds to a valve body location position X1 at which the valve body plate 72 and the valve body 74 are located when the casing cover 40c is attached.

As shown in FIG. 4, the valve body location position X1 overlaps a portion of the stator coil 48 of the first electric motor MG1 when the power transmission device 10 is viewed in the axial direction. Therefore, in the state where the casing cover 40c is attached, when the power transmission device 10 is viewed in the axial direction, the valve body plate 72 and the valve body 74 overlap a portion of the stator coil 48. In other words, in the state where the casing cover 40c is attached, the valve body plate 72 and the valve body 74 are attached to the cover wall 68 so as to overlap a portion of the stator coil 48 in the axial direction.

The portion of the stator coil 48 which overlaps the valve body plate 72 and the valve body 74 in the axial direction is obtained in advance experimentally or analytically as a portion to which broken components of the cover wall 68 easily scatter in a case of a collision of the vehicle.

Accordingly, a portion of the stator coil 48 to which fragments of the cover wall 68 broken at the time of a collision of the vehicle easily scatter is covered by the valve body plate 72 and the valve body 74. Therefore, even when the cover wall 68 is broken by a collision of the vehicle, the stator coil 48 is protected by the valve body plate 72 and the valve body 74, and short-circuiting of the stator coil 48 due to damage by fragments of the cover wall 68 is suppressed.

In the present example, the valve body plate 72 and the valve body 74 installed in the power transmission device 10 are used as reinforcing members for the cover wall 68, so that there is no need to add separate members as reinforcing members for the cover wall 68, and increases in weight and in number of components of the vehicle are also suppressed.

In the present example, since the flange portion 62 surrounding the second bearing support portion 66 is also present, the valve body plate 72 and the valve body 74 may be attached to the cover wall 68 at a position at which a direct distance between the flange portion 62 surrounding the second bearing support portion 66 and the center of the second bearing support portion 66 is longest, so as to overlap a portion of the stator coil 55 in the axial direction to which fragments of the cover wall 68 easily scatter at the time of a collision of the vehicle.

As described above, according to the present example, the valve body 74 and the valve body plate 72 are attached to the cover wall 68 so as to be positioned at a portion of the cover wall 68 at which a direct distance between the first bearing support portion 64 and the flange portion 62 surrounding the first bearing support portion 62 is longest, and therefore, a portion with relatively low rigidity in the cover wall 68 is reinforced by the valve body 74 and the valve body plate 72, and rigidity deterioration of the cover wall 68 is suppressed. In addition, the valve body 74 and the valve body plate 72 provided in the power transmission device 10 function as reinforcing members for the cover wall 68, so that there is no need to provide a new member to reinforce the cover wall 68, and increases in weight and in number of components of the vehicle are also suppressed.

According to the present example, the valve body 74 and the valve body plate 72 are attached to the cover wall 68 so as to overlap the stator coil 48 in the axial direction of the input shaft 41, so that the stator coil 48 is protected by the valve body 74 and the valve body plate 72, and even in a case of a collision of the vehicle, damage to the stator coil 48 by fragments of the cover wall 68 is suppressed.

An example of the present invention is described in detail above with reference to the drawings, and the present invention is also applied to other modes.

For example, in the example described above, the valve body plate 72 and the valve body 74 are attached to the cover wall 68 so as to overlap the stator coil 48 of the first electric motor MG1 in the axial direction, however, the valve body plate 72 and the valve body 74 may be attached to the cover wall 68 so as to overlap the stator coil 55 of the second electric motor MG2 in the axial direction. Alternatively, the valve body plate 72 and the valve body 74 may be attached to the cover wall 68 so as to overlap both of the stator coil 48 and the stator coil 55 in the axial direction.

In the example described above, the valve body plate 72 and the valve body 74 are attached to the inside of the motor chamber 60, however, the valve body plate 72 and the valve body 74 may be attached to the outside of the motor chamber 60.

In the example described above, the valve body plate 72 is provided so as to be put between the valve body 74 and the cover wall 68, however, the valve body plate 72 may be omitted by processing a surface of the cover wall 68 to which the valve body 74 is attached into a plane surface.

In the example described above, the first electric motor MG1 and the second electric motor MG2 are housed in the casing 40, however, it is also possible that one electric motor is housed in the casing 40.

The example described above is just an embodiment, and the present invention can be carried out in modes variously changed or improved based on knowledge of a person skilled in the art.

REFERENCE SIGNS LIST

10: power transmission device for a vehicle
40*b*: axle casing (transaxle casing)
40*c*: casing cover (cover)
46: rotor shaft
48: stator coil (voltage power line)
62: flange portion
64: first bearing support portion (bearing support portion)
68: cover wall
74: valve body
MG1: first electric motor (motor)

The invention claimed is:

1. A power transmission device for a vehicle, comprising: a transaxle casing in which a motor and a voltage power line are housed; and a cover attached so as to close an opening of the transaxle casing, wherein
   the cover includes a flange portion provided at an outer edge portion of the cover and connected to the opening of the transaxle casing, a bearing support portion for a bearing that supports a rotary shaft rotatably, and a cover wall provided between the flange portion and the bearing support portion, and
   a valve body is attached to the cover wall so as to be positioned at a portion of the cover wall at which a direct distance between the bearing support portion and the flange portion surrounding the bearing support portion is longest.

2. The power transmission device for a vehicle according to claim 1, wherein
   the valve body is attached to the cover wall so as to overlap the voltage power line when viewed in an axial direction of the rotary shaft.

3. The power transmission device for a vehicle according to claim 1, wherein
   the bearing support portion is a cylindrical member formed cylindrically, and
   the bearing is fitted to an inner circumferential surface of the cylindrical member.

4. The power transmission device for a vehicle according to claim 2, wherein
   the bearing support portion is a cylindrical member formed cylindrically, and
   the bearing is fitted to an inner circumferential surface of the cylindrical member.

5. The power transmission device for a vehicle according to claim 1, wherein the rotary shaft is a rotor shaft of the motor.

6. The power transmission device for a vehicle according to claim 2, wherein the rotary shaft is a rotor shaft of the motor.

7. The power transmission device for a vehicle according to claim 3, wherein the rotary shaft is a rotor shaft of the motor.

8. The power transmission device for a vehicle according to claim 4, wherein the rotary shaft is a rotor shaft of the motor.

\* \* \* \* \*